United States Patent [19]
Yoshida et al.

[11] Patent Number: 5,992,816
[45] Date of Patent: Nov. 30, 1999

[54] ENGINE MOUNT HAVING A REFERENCE POSITION INDICATING UNIT

[75] Inventors: Nobuya Yoshida, Toyota; Shingo Suzuki, Komaki, both of Japan

[73] Assignee: Toyota Jidosha Kabushiki Kaisha, Aichi-ken, Japan

[21] Appl. No.: 08/795,730

[22] Filed: Feb. 5, 1997

[30] Foreign Application Priority Data

Feb. 8, 1996 [JP] Japan ................................. 8-022725

[51] Int. Cl.$^6$ ............................ F16M 1/00; F16M 13/00; F16F 5/00; G01D 21/00
[52] U.S. Cl. ................. 248/638; 267/140.13; 248/542; 248/562; 33/655
[58] Field of Search ................................. 248/542, 543, 248/693, 562, 568, 602, 637, 636, 904; 180/291; 116/327, 223, 245, 249, 284, 288, 306; 33/300, 632, 641, 533, 645, 534, 677, 613, 678, 655, 555, 600, 579; 52/105; 250/231.13

[56] References Cited

U.S. PATENT DOCUMENTS

| | | | |
|---|---|---|---|
| 2,241,059 | 5/1941 | Foulds | 362/257 |
| 3,128,071 | 4/1964 | Frazer-Nash | 248/542 |
| 4,269,792 | 5/1981 | Winkley | 261/39 B |
| 4,422,242 | 12/1983 | Stocker | 33/181 AT |
| 4,477,149 | 10/1984 | Crespy | 350/288 |
| 4,585,156 | 4/1986 | Raley | 228/132 |
| 5,542,189 | 8/1996 | Lutton | 33/600 |
| 5,721,669 | 2/1998 | Becker | 361/685 |

FOREIGN PATENT DOCUMENTS 4-321833 11/1992 Japan ..................................... 248/562

OTHER PUBLICATIONS

Translation of Japanese Patent # 4–321833, issued Nov. 11, 1992; Translation # 98–4329, Sep. 1998.

*Primary Examiner*—Derek J. Berger
*Assistant Examiner*—Michael D. Nornberg
*Attorney, Agent, or Firm*—Kenyon & Kenyon

[57] ABSTRACT

An engine mount includes an inner member and an outer cylinder having a circumferential position around a central axis of the engine mount, the circumferential position being changeable relative to the inner member. A bracket fixed to the inner member supports an engine on the engine mount, the bracket having a circumferential position around the central axis of the engine mount which is changeable relative to the outer cylinder. A stopper of an elastic material is provided on one of the outer cylinder and the inner member, the stopper contacting the other of the outer cylinder and the inner member when a change in length of one of the outer cylinder and the inner member relative to the other exceeds a reference level. An interconnecting member of an elastic material exerts a pressing force on the outer cylinder and the inner member such that the other of the outer cylinder and the inner member is contacted by the stopper to prevent the change in length of one of the outer cylinder and the inner member from further increasing from the reference level. A reference position indicating unit indicates whether the circumferential positions of the outer cylinder and the bracket relative to each other around the central axis of the engine mount are reference positions.

8 Claims, 4 Drawing Sheets

ENGINE MOUNT HAVING A REFERENCE POSITION INDICATING UNIT

BACKGROUND OF THE INVENTION (1) Field of the Invention

The present invention generally relates to an engine mount, and more particularly to an engine mount for supporting an engine on a frame of an engine compartment of an automotive vehicle.

(2) Description of the Related Art

An engine mount for supporting an engine on an automotive vehicle, which includes a central axis, an outer cylinder and an inner member, is known. The inner member is provided within the outer cylinder along the central axis of the engine mount. For example, Japanese Laid-Open Patent Application No. 4-321833 discloses such an engine mount.

The engine mount of the above publication includes an outer cylinder fixed to a frame of an automotive vehicle by using a bracket, and an inner member to which an engine is fixed by using a mounting bolt. The outer cylinder and the inner member are interconnected by an elastic member such that relative positions of the outer cylinder and the inner member in both an axial direction and a radial direction of the engine mount are changeable.

In the engine mount of the above publication, when the vehicle is running, vibrations from the engine are transferred to the engine mount via the bracket. Such vibrations are mostly absorbed by changes in length of the elastic member interconnecting the outer cylinder and the inner member. There are few vibrations transferred from the engine to the vehicle via the engine mount.

The engine mount of the above publication includes a stopper of an elastic material which is provided on both the outer cylinder and the inner member. The stopper is in contact with the outer cylinder and the inner member so as to prevent a change in length of one of the outer cylinder and the inner member relative to the other from increasing beyond a reference level. Therefore, when the vehicle is running, it is possible for the engine mount of the above publication to maintain the engine in the vehicle in a stable, suitable condition.

Generally, the engine mount is fixed to the frame of the engine compartment of the vehicle after related parts, such as brackets and stays, are attached to the engine mount. After the engine mount is fixed to the frame of the engine compartment, the engine is mounted in the vehicle through the engine mount. As described above, the engine is fixed to the inner member by using the mounting bolt, and the bracket is fixed to the frame of the engine compartment. In order to suitably carry out the mounting of the engine in the vehicle, it is desirable that the circumferential position of the bracket around the central axis of the inner member in the engine mount is a correct reference position after the engine mount is fixed to the frame of the engine compartment and before the engine is mounted on the vehicle.

The engine mount of the above publication includes the stopper which always exerts a pressing force on the outer cylinder and the inner member to prevent the change in length of one of the outer cylinder and the inner member relative to the other from increasing beyond the reference level. Since the outer cylinder is pressed by the stopper due to an elastic force of the stopper, a frictional force between the stopper and the outer cylinder is produced. If the circumferential positions of the outer cylinder and the bracket relative to each other around the central axis of the engine mount are correctly the reference positions, the frictional force serves to prevent the circumferential positions of the bracket and the outer cylinder from changing with respect to each other.

During the fixing of the engine mount to the frame of the engine compartment, a relatively great torque may be exerted on the outer cylinder or the bracket. In the case of the engine mount of the above publication, if such torque is exerted on the outer cylinder or the bracket, the circumferential positions of the outer cylinder and the bracket around the central axis of the engine mount may deviate from the reference positions.

Since the deviated positions of the outer cylinder and the bracket are maintained by the frictional force between the stopper and the outer cylinder in the engine mount of the above publication, it is difficult to correct the deviated positions of the outer cylinder and the bracket, after the engine mount is fixed to the frame of the engine compartment, without using a special jig or performing a complicated operation.

Further, if the deviated positions of the outer cylinder and the bracket are maintained, it is impossible to suitably carry out the mounting of the engine in the vehicle through the engine mount. In the assembly line, it cannot be determined whether the circumferential positions of the outer cylinder and the bracket around the central axis of the engine mount are correctly aligned at the reference positions unless it is found that the engine is suitably fixed to the engine mount.

Therefore, in the case of the engine mount of the above publication, when it is found that the engine is not suitably fixed to the engine mount, it is necessary to stop the mounting of the engine in the vehicle through the engine mount, and the deviated positions of the outer cylinder and the bracket must be corrected to the reference positions by using a special jig or performing a complicated operation.

SUMMARY OF THE INVENTION

An object of the present invention is to provide an improved engine mount in which the above-described problems are eliminated.

Another object of the present invention is to provide an engine mount which allows the circumferential positions of the outer cylinder and the bracket relative to each other around the central axis of the engine mount to be easily corrected into the reference positions after the engine mount is fixed to the frame of the engine compartment.

The above-mentioned objects of the present invention are achieved by an engine mount which includes: an inner member; an outer cylinder circumferentially positioned around a central axis of the engine mount, a circumferential position of the outer cylinder being changeable relative to the inner member; a bracket fixed to the inner member for supporting an engine on the engine mount, the bracket circumferentially positioned around the central axis of the engine mount, a circumferential position of the bracket being changeable relative to the outer cylinder; a stopper of an elastic material provided on one of the outer cylinder and the inner member, the stopper contacting the other of the outer cylinder and the inner member when a change in length of one of the outer cylinder and the inner member relative to the other exceeds a reference level; an interconnecting member of an elastic material exerting a pressing force on the outer cylinder and the inner member such that the other of the outer cylinder and the inner member is contacted by the stopper to prevent the change in length of one of the outer cylinder and the inner member from increasing beyond the reference level; and a reference position indicating unit which indicates whether the circumferential positions of the outer cylinder and the bracket relative to each other around the central axis of the engine mount are reference positions.

It is possible for the engine mount of the present invention to easily correct the circumferential positions of the outer cylinder and the bracket relative to each other around the central axis of the engine mount to the reference positions after the engine mount is fixed to the frame of the engine compartment and before the engine is mounted in the vehicle. It is possible for the engine mount of the present invention to effectively improve the operability in mounting the engine in the vehicle.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
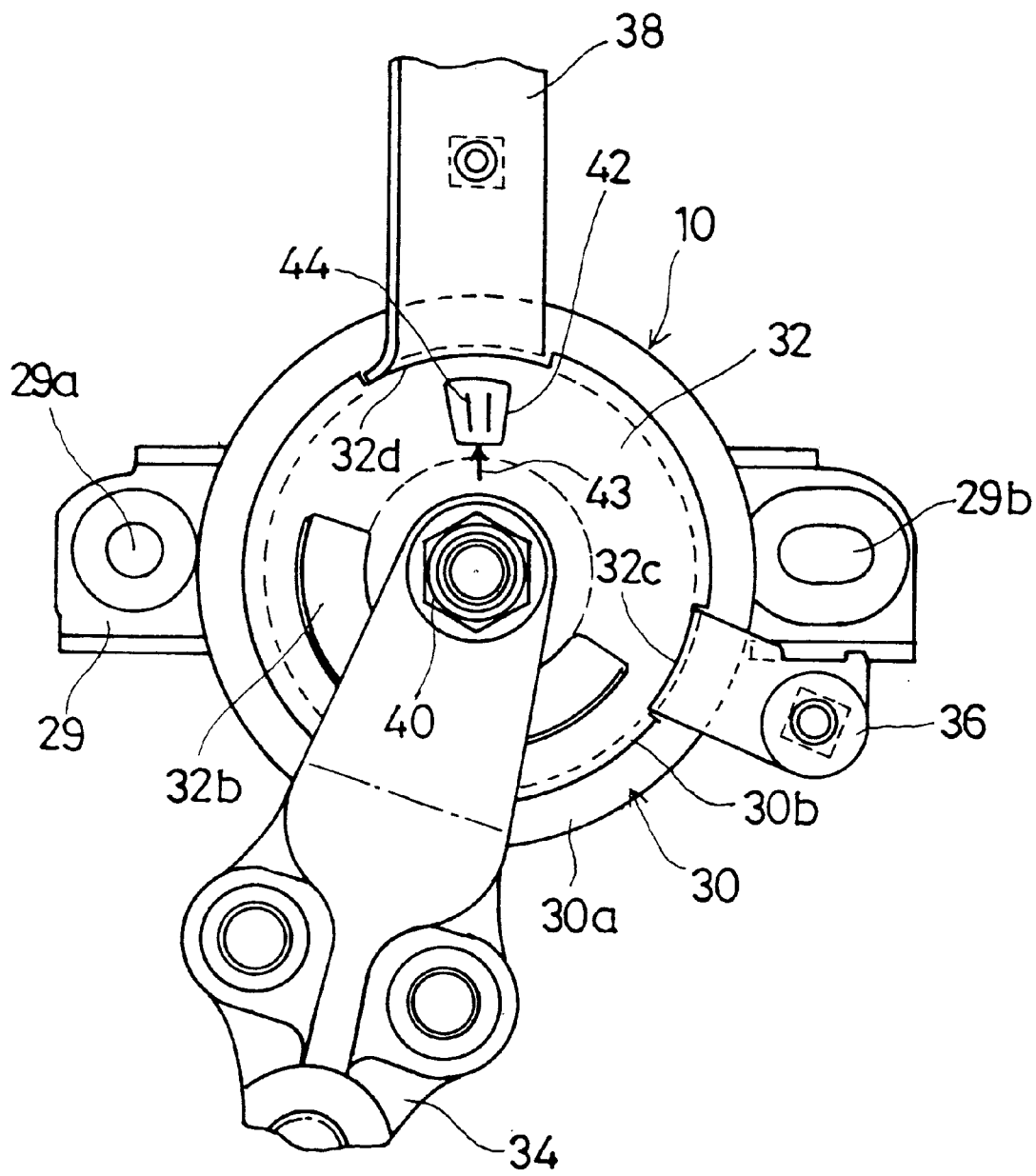
FIG. 1 is a plan view of an engine mount in one embodiment of the present invention.
Figure 2:
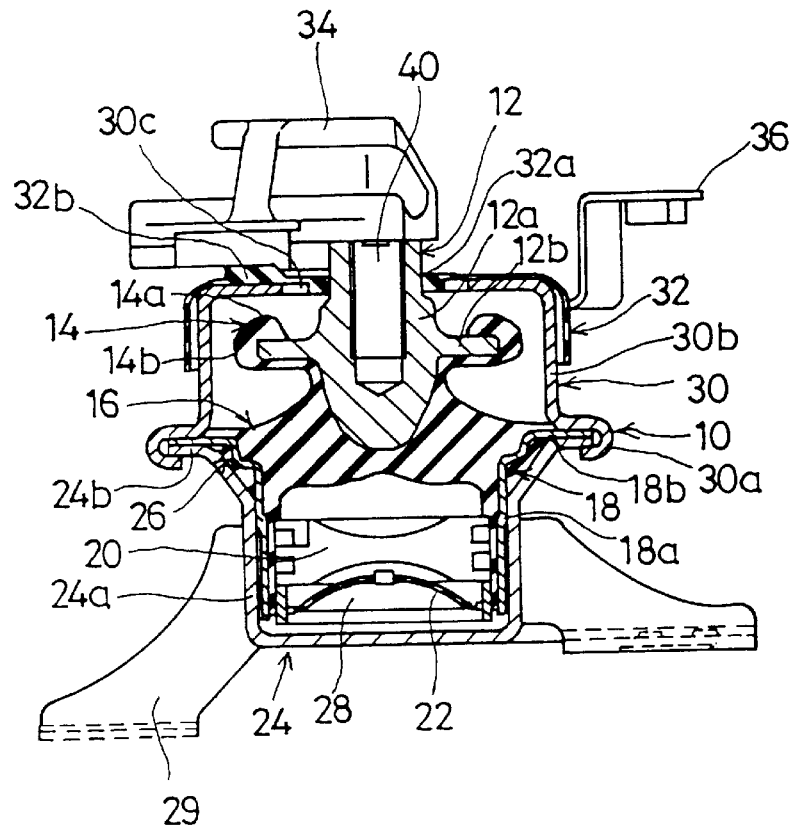
FIG. 2 is a cross-sectional front view of the engine mount in FIG. 1.

FIGS. 1 and 2 show an engine mount 10 in one embodiment of the present invention. FIG. 1 is a plan view of the engine mount 10, and FIG. 2 is a cross-sectional front view of the engine mount 10.

As shown in FIGS. 1 and 2, the engine mount 10 generally has a central axis and an inner member 12 provided along the central axis of the engine mount 10. The inner member 12 includes a cylindrical portion 12a and a disc portion 12b. A threaded hole or opening along the central axis of the inner member 12 is formed in the cylindrical portion 12a. The disc portion 12b encircles the outer periphery of the cylindrical portion 12a at an intermediate position.

The inner member 12 includes a top end surface which has an elliptical cross-section. A stopper 14 is provided on the periphery of the disc portion 12b of the inner member 12. The stopper 14 is made of an elastic material such as rubber. The stopper 14 includes an axial contact portion 14a and a radial contact portion 14b. The axial contact portion 14a is provided above the top surface of the disc portion 12b. The radial contact portion 14b is provided around the peripheral surface of the disc portion 12b.

An interconnecting member 16 is provided on the bottom of the cylindrical portion 12a of the inner member 12. The interconnecting member 16 is made of an elastic material such as rubber. The interconnecting member 16 is a cylindrical member which has a closed end surface on the top side thereof and a hollow opening on the bottom side thereof.

An inner housing 18 is provided on the outer periphery of the interconnecting member 16. The inner housing 18 includes a cylindrical portion 18a and a flange portion 18b. The cylindrical portion 18a has a hollow opening on the top side thereof and a hollow opening on the bottom side thereof. The flange portion 18b is provided such that it has a larger diameter than the periphery of the top end surface of the cylindrical portion 18a.

The interconnecting member 16 is contacted by the inner surface of the cylindrical portion 18a of the inner housing 18 and by the top surface of the flange portion 18b of the inner housing 18.

In the present embodiment, the interconnecting member 16 and the stopper 14 are integrally formed with the elastic material by using a mold in which the inner member 12 and the inner housing 18 are arranged at appropriate locations therein. When the interconnecting member 16 and the stopper 14 are formed by using the mold, the interconnecting member 16 and the stopper 14 are fixed to the inner member 12 at respective contact portions, and at the same time the interconnecting member 16 is fixed to the inner housing 18 at respective contact portions by vulcanization adhesion.

The interconnecting member 16 has an internal portion in which a fluid chamber 20 is formed. The internal portion of the interconnecting member 16 is surrounded by the cylindrical portion 18a of the inner housing 18. After the fluid chamber 20 is filled with fluid, the bottom of the fluid chamber 20 is closed by a diaphragm 22. The diaphragm 22 is provided at the bottom end of the interconnecting member 16.

When the internal pressure of the fluid chamber 20 is at a normal level, the diaphragm 22 is in the shape shown in FIG. 2. When the internal pressure of the fluid chamber 20 is increased to a level higher than the normal level, the diaphragm 22 is deformed downward to the bottom of the engine mount 10.

In the above engine mount 10, the inner housing 18, the diaphragm 22 and the interconnecting member 16 are enclosed in an outer housing 24. The outer housing 24 includes a cylindrical portion 24a and a flange portion 24b. The cylindrical portion 24a has a hollow opening on the top side thereof and a closed end surface on the bottom side thereof. The flange portion 24b is formed with an enlarged diameter such that it encircles the periphery of the top end surface of the cylindrical portion 24a.

When the inner housing 18 is enclosed in the outer housing 24, the flange portion 18b of the inner housing 18 is overlapped onto the flange portion 24b of the outer housing 24.

In the above engine mount 10, a seal ring 26 is provided between the inner housing 18 and the outer housing 24 to seal up the boundaries of the flange portions 18b and 24b and the boundaries of the cylindrical portions 18a and 24a. An air chamber 28 between the inner housing 18 and the outer housing 24 is formed which includes an internal space between the diaphragm 22 and the outer housing 24. The seal ring 26 serves to tightly close the air chamber 28 so as to separate the inside of the outer housing 24 from the outside of the outer housing 24. The air chamber 28 is filled with air under a given pressure.

A bracket 29 is fixed to the outer housing 24. As shown in FIG. 1, the bracket 29 includes a bolt hole 29a and a slot 29b. The engine mount 10 is fixed to a frame (not shown) of an engine compartment of an automotive vehicle by bolting the bracket 29 to the frame of the engine compartment via the bolt hole 29a and the slot 29b.

As shown in FIG. 2, an outer cylinder 30 is provided above the inner housing 18 and the outer housing 24. The outer cylinder 30 includes a flange portion 30a and a cylindrical portion 30b. The flange portion 30a is fixed to the flange portion 18b of the inner housing 18 as well as the flange portion 24a of the outer housing 24 by calking. The cylindrical portion 30b extends upward from the flange portion 30a such that the cylindrical portion 30b covers the inner member 12 and the stopper 14.

In the outer cylinder 30, a through hole 30c is formed in the top surface of the cylindrical portion 30b coaxially with the central axis of the engine mount 10. The through hole 30c has a diameter which is greater than a diameter of the cylindrical portion 12a of the inner member 12. The disc portion 12b of the inner member 12 and the stopper 14 are enclosed in the cylindrical portion 30b. The top end surface of the cylindrical portion 12a of the inner member 12 is loosely fitted in the through hole 30c of the outer cylinder 30 and projects upward from the outer cylinder 30.

In the engine mount 10, a dust cover 32 is provided above the outer cylinder 30. The dust cover 32 includes a through hole 32a to which the top end surface of the cylindrical portion 12a of the inner member 12 is snugly fitted. Similarly to the top end surface of the inner member 12, the through hole 32a of the dust cover 32 is formed such that the through hole 32a has an elliptical cross-section. As the top end surface of the cylindrical portion 12a of the inner member 12 is fitted in the through hole 32a of the dust cover 32 and both have the elliptical cross-section, relative movement of the dust cover 32 around the central axis of the inner member 12 is prevented. Thus, the dust cover 32 is fixed to the inner member 12.

The dust cover 32 includes a bound stopper portion 32b on the top surface of the dust cover 32. As shown in FIG. 1, the bound stopper portion 32b is formed such that it has a semicircular shape. When a bracket 34 (which will be described later) is fixed to the inner member 12, the bound stopper portion 32b is interposed between the bracket 34 and the engine mount 10 to prevent movement of the bracket 34 on the engine mount 10.

As shown in FIG. 1, in the engine mount 10, two stays 36 and 38 are fixed to the outer cylinder 30. The dust cover 32 includes recessed portions 32c and 32d. The recessed portions 32c and 32d are formed so as to avoid interference between the dust cover 32 and the stays 36 and 38. The dust cover 32 is attached to the top of the outer cylinder 30 such that the recessed portions 32c and 32d are fitted to the stays 36 and 38, respectively. When the dust cover 32 is attached to the outer cylinder 30, the through hole 30c of the outer cylinder 30 is closed by the dust cover 32.

The dust cover 32 is not fixed to the outer cylinder 30. Therefore, the circumferential position of the dust cover 32 relative to the outer cylinder 30 around the central axis of the engine mount 20 can easily change.

As shown in FIG. 2, the bracket 34 is fixed to the cylindrical portion 12a of the inner member 12. As shown in FIG. 1, a bolt 40 inserted into a hole of the bracket 34 is fastened to the threaded hole of the inner member 12 so that the bracket 34 is fixed to the inner member 12. The engine is fixed to the bracket 34. When the engine is mounted on the bracket 34, a downward force due to the weight of the engine acts on the bracket 34 as well as the engine mount 10 in the downward direction in FIG. 2.

As shown in FIG. 1, the dust cover 32 includes a window 42 provided in a top surface of the dust cover 32, and an arrow 43 adjacent to the window 42. The arrow 43 indicates the center of the window 42. Further, the outer cylinder 30 which is provided beneath the dust cover 32 includes a mark 44 on a top surface of the outer cylinder 30. In the present embodiment, the window 42, the arrow 43 and the mark 44 constitute a reference position indicating unit of the present invention.

As described above, the bracket 34 is fixed to the inner member 12. The circumferential position of the dust cover 32 around the central axis of the inner member 12 in the engine mount 10 does not change. That is, in the above engine mount 10, the circumferential positions of the bracket 34 and the dust cover 32 relative to each other around the central axis of the inner member 12 do not change.

The inner member 12 and the outer cylinder 30 are connected to each other by the interconnecting member 16. As described above, the dust cover 32 is fixed to the inner member 12, and the two elements are rotatable together around the central axis of the inner member 12. The dust cover 32 is not fixed to the outer cylinder 30. The circumferential position of the outer cylinder 30 around the central axis of the inner member 12 in the engine mount 10 is changeable. Therefore, the circumferential positions of the outer cylinder 30 and the bracket 34 relative to each other around the central axis of the engine mount 10 are changeable.

After the engine mount 10 is fixed to the frame of the engine compartment, the engine is mounted in the vehicle. In order to suitably carry out the mounting of the engine in the vehicle, it is necessary that the circumferential position of the bracket 34 around the central axis of the inner member 12 in the engine mount 10 is a correct reference position after the engine mount 10 is fixed to the frame of the engine compartment.

As described above, the circumferential positions of the outer cylinder 30 and the bracket 34 relative to each other around the central axis of the engine mount 10 are changeable. Even if the bracket 34 is initially located at the reference position on the engine mount 10, the circumferential position of the bracket 34 may deviate from the reference position when a certain torque is exerted on the bracket 34 during the fixing of the engine mount 10 to the frame of the engine compartment.

In the above-described embodiment, the window 42, the arrow 43, and the mark 44 are arranged such that the mark 44 on the outer cylinder 30 appears in the window 42 of the dust cover 32 (the circumferential position of the dust cover 32 around the central axis of the inner member 12 does not change) and the position of the center of the mark 44 is indicated by the arrow 43 when the circumferential positions of the outer cylinder 30 and the dust cover 32 relative to each other around the central axis of the engine mount 10 are in the correct reference positions.

In addition, in the above-described embodiment, the window 42 has a size appropriate to indicate that the circumferential position of the bracket 34 around the central axis of the engine mount 10 is in the range of a tolerance with respect to the reference position.

In the case of the engine mount 10 of the present embodiment, it is possible to easily determine that the circumferential position of the bracket 34 around the central axis of the engine mount 10 is correct, by checking that the mark 44 appears in the window 42 after the engine mount 10 is fixed to the frame of the engine compartment. If the mark 44 does not appear in the window 42 after the fixing of the engine mount 10 to the engine compartment, the circumferential position of the bracket 34 can be easily corrected to the reference position by making the mark 44 appear in the window 42.

In the engine mount 10 of the present embodiment, a pressing force of the interconnecting member 16 is exerted on the inner member 12 and the outer cylinder 30. When the downward force due to the weight of the engine does not act on the bracket 34, the outer cylinder 30 is contacted by the axial contact portion 14a of the stopper 14 due to the pressing force of the interconnecting member 16. A frictional force between the stopper 14 and the outer cylinder 30 is produced when the outer cylinder 30 is contacted by the stopper 14. This frictional force serves to prevent the relative movement of the outer member 30 around the central axis of the inner member 12. That is, the frictional force serves to prevent the circumferential positions of the bracket 34 and the outer cylinder 30 relative to each other from changing around the central axis of the engine mount 10.

Accordingly, in the engine mount 10 of the present embodiment, the circumferential position of the bracket 34 around the central axis of the engine mount 10 is maintained at the reference position if the circumferential position of the bracket 34 after the engine mount 10 is fixed to the frame of the engine compartment is corrected to the reference position so as to make the mark 44 appear in the window 42. Thus, it is possible for the engine mount 10 of the present embodiment to effectively improve the operability in mounting the engine in the vehicle. It is unnecessary to utilize a special jig or perform a complicated operation in order to correctly carry out the mounting of the engine in the vehicle.

Next, a description will be given of a function of the engine mount 10 when the engine is mounted in the vehicle via the engine mount 10.

As the engine is placed on the engine mount 10 fixed to the frame of the engine compartment, the downward force due to the weight of the engine acts on the inner member 12 and the interconnecting member 16 via the bracket 34. The inner member 12 and the interconnecting member 16 are pressed downwardly by the bracket 34. The downward force from the interconnecting member 16 is transferred to the diaphragm 22 via the fluid contained in the fluid chamber 20. The interconnecting member 16 and the diaphragm 22 are deformed downward, and the stopper 14 is separated from the outer cylinder 30. After the engine is mounted in the vehicle, the engine mount 10 is in the condition mentioned above.

When the vehicle is running, vibrations from the engine are transferred to the engine mount 10 via the bracket 34. Such vibrations are mostly absorbed by changes in length of the interconnecting member 16 and the diaphragm 22. Since there are so few vibrations which are transferred from the engine to the vehicle via the engine mount 10, it is possible to provide a good ride comfort for the occupants of the vehicle when it is running.

In addition, when the vehicle turns a corner, accelerates or decelerates, the engine is subject to excessively large inclination or vertical movement. In such a condition, the change in length of the inner member 12 relative to the outer cylinder 30 in one of the expansion or compression directions may exceed a reference level.

When a change in the radial length of the inner member 12 relative to the outer cylinder 30 in the engine mount 10 of the present embodiment exceeds a reference level related to the radial expansion direction of the engine mount 10, the inside side surface of the outer cylinder 30 is contacted by the radial contact portion 14b of the stopper 14. As the outer cylinder 30 is contacted by the stopper 14, the change in the radial length of the inner member 12 is prevented from further increasing from the reference level by the stopper 14.

When a change in the axial length of the inner member 12 relative to the outer cylinder 30 in the engine mount 10 of the present embodiment exceeds a reference level related to the axial expansion direction of the engine mount 10, the inside bottom surface of the outer cylinder 30 is contacted by the axial contact portion 14a of the stopper 14. As the outer cylinder 30 is contacted by the stopper 14, the change in the axial length of the inner member 12 is prevented from further increasing from the reference level by the stopper 14.

When a change in length of the inner member 12 relative to the outer cylinder 30 in the compression direction of the engine mount 10 exceeds a reference level related to the compression direction of the engine mount 10, the bracket 34 is contacted by the bound stopper portion 32b of the dust cover 32. As the bracket 34 is contacted by the bound stopper portion 32b of the dust cover 32, the change in length of the inner member 12 in the compression direction of the engine mount 10 is prevented from further increasing from the reference level by the bound stopper portion 32b.

Accordingly, it is possible for the engine mount 10 of the present embodiment to prevent the inclination or vertical movement of the engine from becoming excessively large when the vehicle turns a corner, accelerates or decelerates.

In the above-described embodiment, the stopper 14 constitutes the stopper of the engine mount of the present invention, and the window 42, the arrow 43 and the mark 44 constitute the reference position indicating unit of the present invention.

In the above-described embodiment, the stopper 14 is provided on the periphery of the inner member 12. The stopper of the engine mount according to the present invention is not limited to the present embodiment. Alternatively, the stopper of the present invention can be arranged such that the axial contact portion 14a and the radial contact portion 14b are provided on the inside surfaces of the outer cylinder 30.

Figure 3:
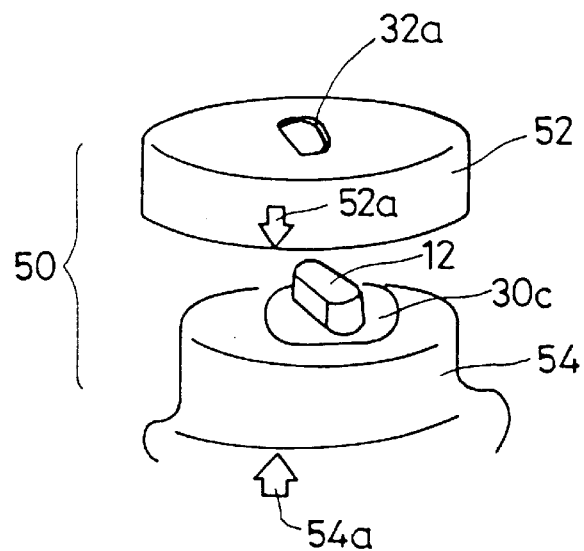
FIG. 3 is a perspective view of an engine mount which is a variation of the engine mount in FIGS. 1 and 2.

Next, FIG. 3 shows an engine mount 50 which is a variation of the engine mount 10 in the above-described embodiment in FIGS. 1 and 2. In FIG. 3, the elements which are the same as corresponding elements in FIGS. 1 and 2 are designated by the same reference numerals, and a description thereof will be omitted.

As shown in FIG. 3, the engine mount 50 includes a dust cover 52 and an outer cylinder 54. The dust cover 52 includes an arrow 52a on an outside peripheral surface of the dust cover 52. The outer cylinder 54 includes an arrow 54a on an outside peripheral surface of the outer cylinder 54. The arrow 52a and the arrow 54a are arranged such that a circumferential position indicated by the arrow 52a on the dust cover 52 is in accordance with a circumferential position indicated by the arrow 54a on the outer cylinder 54 when the circumferential positions of the outer cylinder 54 and the dust cover 52 relative to each other around the central axis of the engine mount 10 are correctly aligned with the reference positions.

Similarly to the engine mount 10 in FIGS. 1 and 2, the engine mount 50 of this embodiment allows the circumferential positions of the outer cylinder 54 and the bracket 34 (which is fixed to the inner member 12 and fixed to the dust cover 52) relative to each other around the central axis of the engine mount 50 to be easily corrected after the engine mount is fixed to the frame of the engine compartment (and before the engine is mounted on the vehicle). In this embodiment, the arrow 52a and the arrow 54a constitute the reference position indicating unit of the present invention.

Figure 4:
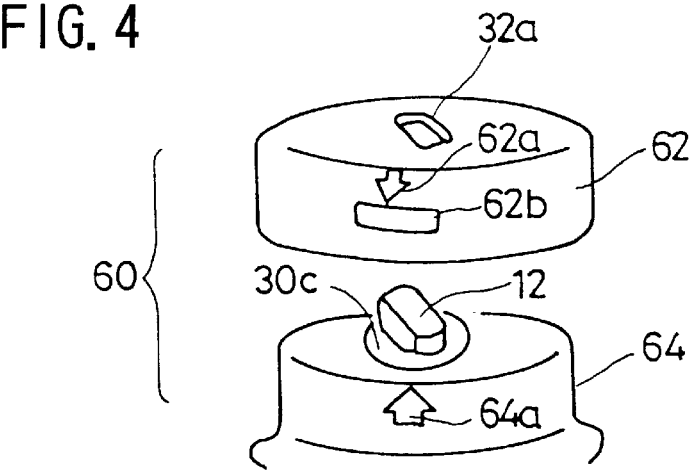
FIG. 4 is a perspective view of an engine mount which is another variation of the engine mount in FIGS. 1 and 2.

FIG. 4 shows an engine mount 60 which is another variation of the engine mount 10 in the previously-described embodiment in FIGS. 1 and 2. In FIG. 4, the elements which are the same as corresponding elements in FIGS. 1 and 2 are designated by the same reference numerals, and a description thereof will be omitted.

As shown in FIG. 4, the engine mount 60 includes a dust cover 62 and an outer cylinder 64. The dust cover 62 includes an arrow 62a and a window 62b on an outside peripheral surface of the dust cover 62. The position of the center of the window 62b is indicated by the arrow 62a. The outer cylinder 64 includes an arrow 64a on an outside peripheral surface of the outer cylinder 64. The outer cylinder 64 is arranged such that the arrow 64a on the outer cylinder 64 appears in the window 62 of the dust cover 62 when the dust cover 62 is attached to the outer cylinder 64.

In this embodiment, the arrow 62a, the window 62b and the arrow 64a are arranged such that the arrow 64a on the outer cylinder 64 appears in the center of the window 62b of the dust cover 62 and a circumferential position indicated by the arrow 62a on the dust cover 62 is in accordance with a circumferential position indicated by the arrow 64a on the outer cylinder 64 when the circumferential positions of the outer cylinder 64 and the dust cover 62 relative to each other around the central axis of the engine mount 60 are correctly aligned with the reference positions.

Similarly to the engine mount 10 in FIGS. 1 and 2, the engine mount 60 of this embodiment allows the circumferential positions of the outer cylinder 64 and the bracket 34 (which is fixed to the inner member 12 and fixed to the dust cover 62) relative to each other around the central axis of the engine mount 60 to be easily corrected after the engine mount is fixed to the frame of the engine compartment (and before the engine is mounted in the vehicle).

In this embodiment, the arrow 62a, the window 62b and the arrow 64a constitute the reference position indicating unit of the present invention.

Figure 5:
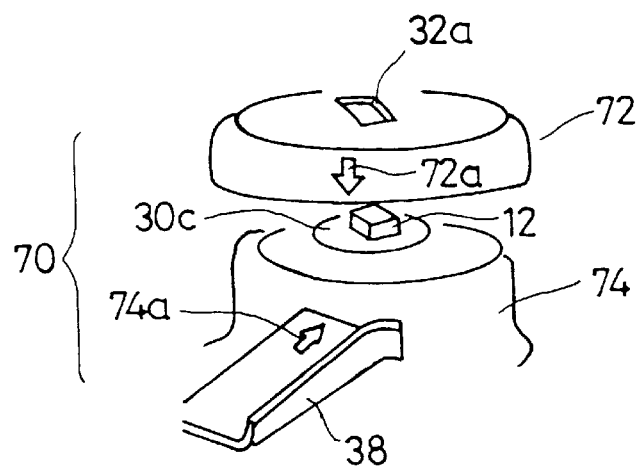
FIG. 5 is a perspective view of an engine mount which is still another variation of the engine mount in FIGS. 1 and 2.

FIG. 5 shows an engine mount 70 which is still another variation of the engine mount 10 in the previously-described embodiment in FIGS. 1 and 2. In FIG. 5, the elements which are the same as corresponding elements in FIGS. 1 and 2 are designated by the same reference numerals, and a description thereof will be omitted.

As shown in FIG. 5, the engine mount 70 includes a dust cover 72 and an outer cylinder 74. The dust cover 72 includes an arrow 72a on an outside peripheral surface of the dust cover 72. The outer cylinder 74 includes the stay 38 which is fixed to the periphery of the outer cylinder 74. The stay 38 includes an arrow 74a on the top surface of the stay 38.

In this embodiment, the arrow 72a and the arrow 74a are arranged such that a circumferential position indicated by the arrow 72a on the dust cover 72 is in accordance with a circumferential position indicated by the arrow 74a on the stay 38 (which is fixed to the outer cylinder 74) when the circumferential positions of the outer cylinder 74 and the dust cover 72 relative to each other around the central axis of the engine mount 70 are correctly aligned with the reference positions.

Therefore, the engine mount 70 of this embodiment also allows the circumferential positions of the outer cylinder 74 and the bracket 34 (which is fixed to the inner member 12 and fixed to the dust cover 72) relative to each other around the central axis of the engine mount 70 to be easily corrected after the engine mount is fixed to the frame of the engine compartment (and before the engine is mounted in the vehicle). In this embodiment, the arrow 72a, the stay 38 and the arrow 74a constitute the reference position indicating unit of the present invention.

Figure 6:
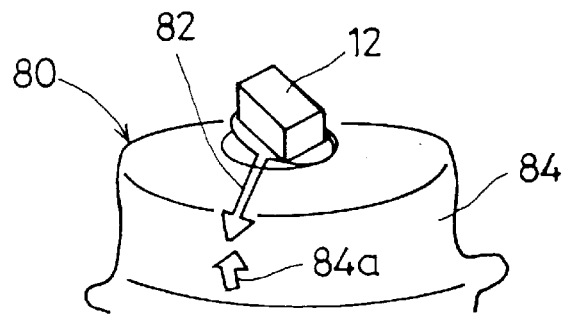
FIG. 6 is a perspective view of an engine mount which is a further variation of the engine mount in FIGS. 1 and 2.

FIG. 6 shows an engine mount 80 which is a further variation of the engine mount 10 in the previously-described embodiment in FIGS. 1 and 2. In FIG. 6, the elements which are the same as corresponding elements in FIGS. 1 and 2 are designated by the same reference numerals, and a description thereof will be omitted.

As shown in FIG. 6, the engine mount 80 includes a needle 82 and an outer cylinder 84. The needle 82 is fixed to the inner member 12. The needle 82 has an arrow portion at an end of the needle 82, and the arrow portion is formed into the shape of an arrow. The outer cylinder 84 includes an arrow 84a on an outside peripheral surface of the outer cylinder 84.

In this embodiment, the needle 82 and the arrow 84a are arranged such that a circumferential position indicated by the arrow portion of the needle 82 (fixed to the inner member 12) is in accordance with a circumferential position indicated by the arrow 84a on the outer cylinder 84 when the circumferential positions of the outer cylinder 84 and the inner member 12 relative to each other around the central axis of the engine mount 80 are correctly aligned with the reference positions.

Therefore, the engine mount 80 of this embodiment also allows the circumferential positions of the outer cylinder 84 and the bracket 34 (which is fixed to the inner member 12) relative to each other around the central axis of the engine mount 80 to be easily corrected after the engine mount is fixed to the frame of the engine compartment (and before the engine is mounted in the vehicle). In this embodiment, the needle 82 and the arrow 84a constitute the reference position indicating unit of the present invention.

Figure 7:
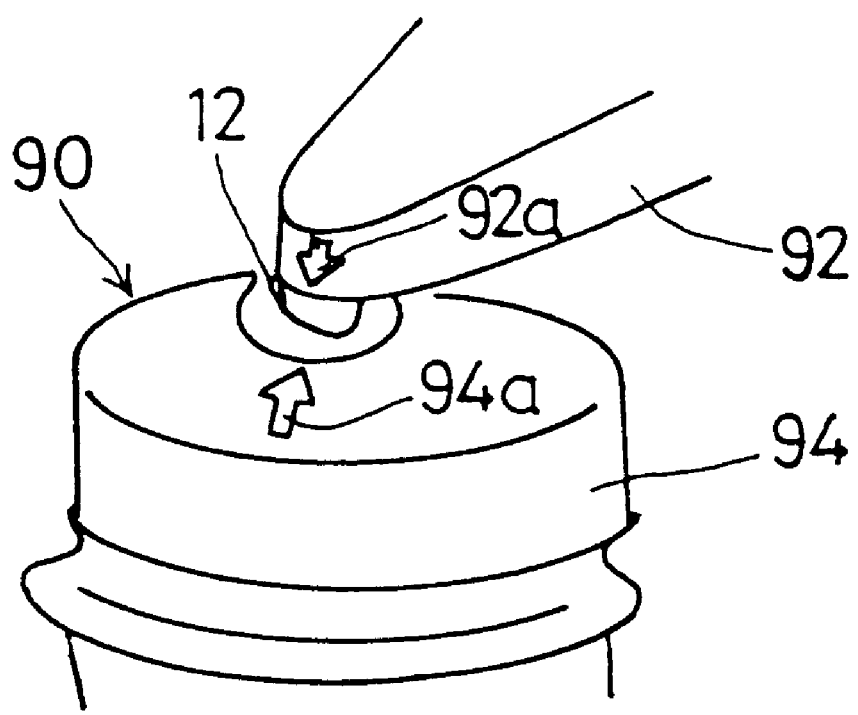
FIG. 7 is a perspective view of an engine mount which is another variation of the engine mount in FIGS. 1 and 2.

FIG. 7 shows an engine mount 90 which is another variation of the engine mount 10 in the previously-described embodiment in FIGS. 1 and 2. In FIG. 7, the elements which are the same as corresponding elements in FIGS. 1 and 2 are designated by the same reference numerals, and a description thereof will be omitted.

As shown in FIG. 7, the engine mount 90 includes a bracket 92 and an outer cylinder 94. The bracket 92 is fixed to the inner member 12. The bracket 92 includes an arrow 92a on an outside peripheral surface of the bracket 92. The outer cylinder 94 includes an arrow 94a on an outside top surface of the outer cylinder 94.

In this embodiment, the bracket 92 and the outer cylinder 94 are arranged such that a circumferential position indicated by the arrow 92a on the bracket 92 (fixed to the inner member 12) is in accordance with a circumferential position indicated by the arrow 94a on the outer cylinder 94 when the circumferential positions of the outer cylinder 94 and the inner member 12 relative to each other around the central axis of the engine mount 90 are correctly aligned with the reference positions.

Therefore, the engine mount 90 of this embodiment also allows the circumferential positions of the outer cylinder 94 and the bracket 34 (which is fixed to the inner member 12 and not shown in FIG. 7) relative to each other around the central axis of the engine mount 90 to be easily corrected after the engine mount is fixed to the frame of the engine compartment and before the engine is mounted in the vehicle. In this embodiment, the bracket 92, the arrow 92a and the arrow 94a constitute the reference position indicating unit of the present invention.

As described in the foregoing, by using the reference position indicating unit, it is possible for the engine mount of the present invention to easily correct the circumferential positions of the outer cylinder and the bracket relative to each other around the central axis of the engine mount to the reference positions after the engine mount is fixed to the frame of the engine compartment and before the engine is mounted in the vehicle. It is possible for the engine mount of the present invention to effectively improve the operability in mounting the engine in the vehicle.

Further, the present invention is not limited to the above-described embodiments, and variations and modifications may be made without departing from the scope of the present invention.

What is claimed is:

1. An engine mount comprising:

an inner member;

an outer cylinder circumferentially positioned around a central axis of the engine mount, a circumferential position of the outer member being changeable relative to the inner member;

a bracket fixed to the inner member for supporting an engine on the engine mount, said bracket circumferentially positioned around the central axis of the engine mount, a circumferential position of said bracket being changeable relative to the outer cylinder;

a stopper of an elastic material provided on one of the outer cylinder and the inner member, said stopper contacting the other of the outer cylinder and the inner member when a change in length of the outer cylinder and the inner member relative to one another exceeds a reference level;

an interconnecting member of an elastic material exerting a pressing force on the outer cylinder and the inner member such that the other of the outer cylinder and the inner member is contacted by said stopper to prevent said change in length from increasing beyond the reference level; and reference position indicating means for indicating whether the outer cylinder and the bracket are in a predetermined circumferential position relative to each other around the central axis of the engine mount, the reference position indicating means including a first indicator indicating a circumferential position of the outer cylinder about the central axis of the engine mount and a second indicator indicating a circumferential position of the inner member about the central axis of the engine mount.

2. The engine mount according to claim 1, wherein said engine mount further comprises a dust cover provided above the outer cylinder and fixed to the inner member, the dust cover having a top surface, the outer cylinder having a top surface, and said reference position indicating means comprising:

a window provided in the top surface of the dust cover;

an arrow provided on the dust cover adjacent to the window; and a mark provided on the top surface of the outer cylinder.

3. The engine mount according to claim 1, wherein said engine mount further comprises a dust cover provided above the outer cylinder and fixed to the inner member, the dust cover having an outside surface, the outer cylinder having an outside surface, and said reference position indicating means comprising:

a first arrow provided on the outside surface of the dust cover; and a second arrow provided on the outside surface of the outer cylinder.

4. The engine mount according to claim 1, wherein said engine mount further comprises a dust cover provided above the outer cylinder and fixed to the inner member, the dust cover having an outside surface, the outer cylinder having an outside surface, and said reference position indicating means comprising:

a window provided in the outside surface of the dust cover;

a first arrow provided on the outside surface of the dust cover adjacent to the window; and a second arrow provided on the outside surface of the outer cylinder.

5. The engine mount according to claim 1, wherein said engine mount further comprises a dust cover provided above the outer cylinder and fixed to the inner member, the dust cover having an outside surface, the outer cylinder having an outside surface, and said reference position indicating means comprising:

a first arrow provided on the outside surface of the dust cover;

a stay fixed to the outside surface of the outer cylinder and having a top surface; and a second arrow provided on the top surface of the stay.

6. The engine mount according to claim 1, wherein the outer cylinder has an outside surface and said reference position indicating means comprises:

a needle fixed to the inner member and having an arrow portion; and an arrow provided on the outside surface of the outer cylinder.

7. The engine mount according to claim 1, wherein said engine mount further comprises an additional bracket fixed to the inner member and having an outside surface, the outer cylinder having an outside surface, and said reference position indicating means comprising:

a first arrow provided on the outside surface of the additional bracket; and a second arrow provided on the outside surface of the outer cylinder.

8. An engine mount comprising:

a first member defining an outer substantially cylindrical surface, with a central axis of the outer cylindrical surface being substantially coincident with a central axis of the engine mount;

a second member rotatably received within the first member;

an engine supporting bracket non-rotatably coupled to the second member;

a stopper coupled to one of the first and second members, wherein the stopper is positioned so that, upon relative motion of the first and second members in a direction substantially parallel to the central axis, the stopper contacts the other of the first and second members to limit the axial motion of the first and second members relative to one another and to maintain the rotational position of the first and second members relative to one another;

an elastic interconnecting member coupled between the first and second members, wherein the interconnecting member is biased to bring the stopper into contact with the other of the first and second members when no engine is mounted on the engine mount;

reference position indicating means for indicating whether the rotational position of the first and second members, relative to one another, is a predetermined reference position, the reference position indicating means including a first indicator indicating a circumferential position of the first member about the central axis of the engine mount and a second indicator indicating a circumferential position of the second member about the central axis of the engine mount.

* * * * *